(12) United States Patent
Seok et al.

(10) Patent No.: US 11,943,012 B2
(45) Date of Patent: Mar. 26, 2024

(54) DEVICE AND METHOD FOR MULTI-ACCESS POINT COLLABORATIVE SOUNDING IN A WIRELESS NETWORK

(71) Applicant: MediaTek Singapore Pte. Ltd., Singapore (SG)

(72) Inventors: Yongho Seok, San Jose, CA (US); Jianhan Liu, San Jose, CA (US); James Chih-Shi Yee, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 18/138,659

(22) Filed: Apr. 24, 2023

(65) Prior Publication Data
US 2023/0261699 A1 Aug. 17, 2023

Related U.S. Application Data

(60) Division of application No. 17/387,822, filed on Jul. 28, 2021, now Pat. No. 11,646,767, which is a continuation of application No. 16/853,554, filed on Apr. 20, 2020, now Pat. No. 11,108,439.

(60) Provisional application No. 62/836,778, filed on Apr. 22, 2019.

(51) Int. Cl.
| H04B 7/024 | (2017.01) |
| H04B 7/06 | (2006.01) |
| H04W 24/02 | (2009.01) |
| H04W 84/12 | (2009.01) |

(52) U.S. Cl.
CPC .......... *H04B 7/024* (2013.01); *H04B 7/0617* (2013.01); *H04B 7/0626* (2013.01); *H04W 24/02* (2013.01); *H04W 84/12* (2013.01)

(58) Field of Classification Search
CPC ..... H04B 7/024; H04B 7/0617; H04B 7/0626
USPC ........................................ 375/267
See application file for complete search history.

(56) References Cited

U.S. PATENT DOCUMENTS

| 11,108,439 B2 | 8/2021 | Seok et al. | |
| 2004/0219926 A1* | 11/2004 | Kim ................. | H04W 36/0088 455/452.2 |
| 2010/0041425 A1 | 2/2010 | Cesar et al. | |
| 2013/0107916 A1 | 5/2013 | Liu et al. | |

(Continued)

OTHER PUBLICATIONS

Ross Jian Yu (Huawei Technologies): "Sounding procedure in AP collaboration" Jul. 15, 2019; 11 pages.

(Continued)

*Primary Examiner* — Ted M Wang

(57) ABSTRACT

Embodiments of the present invention provide an apparatus and method for a MAP wireless network that includes a collaborative channel sounding measurement phase to determine channel state information between devices (e.g., the channel state between an STA and a collaborative AP) for efficient configuration of the MAP wireless network and to improve the performance of the MAP wireless networks. The wireless AP and wireless STAs associated with the collaborative APs can simultaneously transmit by applying collaborative beamforming where the interferences between channels nullify each other (e.g., nulling), and the beamforming is performed based on a sounding phase performed by the collaborative APs.

20 Claims, 12 Drawing Sheets

(56) References Cited

U.S. PATENT DOCUMENTS

2016/0330732 A1    11/2016   Moon et al.
2017/0150493 A1    5/2017   Seok
2018/0206274 A1    7/2018   Cherian et al.
2018/0263043 A1    9/2018   Zhou et al.
2019/0028168 A1    1/2019   Vermani et al.

OTHER PUBLICATIONS

Ross Jian Yu (Huawei Technologies): "Sounding Procedure in AP . . . "; 802 11 Working Group of the LAN/MAN Standards Committee; Apr. 4, 2019; 754 pages.

\* cited by examiner

DEVICE AND METHOD FOR MULTI-ACCESS POINT COLLABORATIVE SOUNDING IN A WIRELESS NETWORK

CROSS-REFERENCE TO RELATED APPLICATIONS

This application is a divisional of copending U.S. patent application Ser. No. 17/387,822, with filing date Jul. 28, 2021, by Yongho Seok, et al, which claims benefit of and priority to U.S. patent application Ser. No. 16/853,554, with filing date Apr. 20, 2020, by Yongho Seok, et al, which claims the benefit of and priority to provisional patent application Ser. No. 62/836,778, by Yongho Seok, et al. These applications are hereby incorporated by reference in their entirety.

FIELD

Embodiments of the present invention generally relate to the field of wireless communications. More specifically, embodiments of the present invention relate to systems and methods for collaborative beamforming and sounding within a wireless communication network.

BACKGROUND

Modern electronic devices typically send and receive data with other electronic devices wirelessly, e.g., using Wi-Fi within a Wi-Fi network, and the performance of Wi-Fi networks can be improved by using more than one wireless access point device (wireless AP). By using multiple APs in a Multi-AP (MAP) wireless network, the overall efficiency and performance of the Wi-Fi network can be greatly improved, and poor network connections resulting from obstructions and interference can be avoided. Moreover, a wireless AP in a MAP wireless network can fail without disrupting the entire wireless network since another wireless AP can take over.

In a MAP wireless network, multiple wireless APs enrolled in the MAP wireless network and multiple wireless stations (STAs) can cause interference during cooperative Multi-AP transmission. To prevent or mitigate this unwanted interference, the output of the physical antennas of the wireless APs can be modified using beamforming so that different channels used by the collaborative APs and the associated STAs do not cause interference. Beamforming techniques are commonly applied to cancel interfering signals and produce a strong beam to communicate a data signal, for example, using computed weighted vectors. One goal of collaborative beamforming is to allow APs of the MAP wireless network to transmit concurrently without causing interference with each other. Therefore, to perform collaborative beamforming efficiently, devices of the MAP wireless network should perform collaborative beamforming based on up-to-date channel state information, such as measured interference levels of different channels so that interference between devices can be prevented or substantially reduced.

Channel sounding is a well-known technique that evaluates the radio environment for wireless communication, for example, in MIMO or MAP wireless networks. As wireless signals propagate in multiple paths (the multipath effect) due to physical obstacles, channel sounding techniques are used to process/observe the multidimensional spatial-temporal signal and estimate channel characteristics. Therefore, what is needed is an approach to communication in a MAP wireless network that includes channel sounding to improve the performance of the MAP wireless networks.

SUMMARY

Accordingly, embodiments of the present invention are directed toward an approach to communication in a MAP wireless network that includes a collaborative channel sounding measurement phase to determine channel state information between devices for efficient configuration (e.g., beamforming) of the MAP wireless network and to improve the performance of the MAP wireless networks. More specifically, embodiments of the present invention provide an apparatus and method for a MAP wireless network that includes a collaborative channel sounding measurement phase to determine channel state information between devices (e.g., the channel state between an STA and a collaborative AP) for efficient configuration of the MAP wireless network and to improve the performance of the MAP wireless networks. The wireless AP and wireless STAs associated with the collaborative APs can simultaneously transmit by applying collaborative beamforming so that the interferences between channels nullify each other (e.g., nulling), and the beamforming is performed based on a sounding phase performed by the collaborative APs. The sounding protocol can include a collaborative sounding measurement phase and a collaborative sounding feedback report phase, using NDPs, for example, as described herein according to embodiments of the present invention.

According to one embodiment, a method of collaborative sounding measurement in a multi-AP (MAP) wireless network is disclosed. The method includes receiving, by a wireless station (STA), a first announcement frame from an access point (AP), where the AP is a transmission opportunity (TXOP) holder operable to perform collaborative beamforming with a collaborative AP, receiving, by the STA, a first null data packet (NDP) frame from the AP, and calculating beamforming feedback based on the receiving the first NDP frame from the AP for performing collaborative beamforming between the AP and the collaborative AP.

According to some embodiments, the calculating beamforming feedback includes the STA calculating data channel beamforming feedback between the STA and the AP.

According to some embodiments, the method includes receiving, by the STA, a second announcement frame from the collaborative AP, receiving, by the STA, a second NDP frame from the collaborative AP, and calculating beamforming feedback based on the receiving the second NDP frame from the collaborative AP for performing collaborative beamforming between the AP and the collaborative AP.

According to some embodiments, the calculating beamforming feedback based on the receiving the second NDP frame from the collaborative AP includes calculating interference channel beamforming feedback between the STA and the collaborative AP.

According to some embodiments, the method includes accessing, by the STA, an STA info field of the second announcement frame to determine if the second announcement frame corresponds to a basic service set ID (BSSID) of the STA.

According to some embodiments, the first NDP frame and the second NDP frame are multiplexed in a frequency domain.

According to some embodiments, the first NDP frame uses odd subcarriers and the second NDP uses even subcarriers.

According to another embodiment, a method of collaborative sounding measurement in a multi-AP (MAP) wireless network is disclosed. The method includes transmitting, by an access point (AP), a first announcement frame to a wireless station (STA), where the AP is a transmission opportunity (TXOP) holder operable to perform collaborative beamforming with a collaborative AP, transmitting, by the AP, a first null data packet (NDP) frame to the STA, and receiving beamforming feedback calculated based on reception of the first NDP frame for performing collaborative beamforming between the AP and the collaborative AP.

According to some embodiments, the announcement frame includes an STA info field identifying a basic service set ID (BSSID).

According to some embodiments, the method further includes transmitting, by the collaborative AP, a second announcement frame to the STA, and transmitting, by the collaborative AP, a second NDP frame to the STA, and the STA calculates beamforming feedback based on receiving the second NDP frame from the collaborative AP for performing collaborative beamforming between the AP and the collaborative AP.

According to some embodiments, the first NDP frame and the second NDP frame are multiplexed in a frequency domain.

According to some embodiments, the first NDP frame uses odd subcarriers and the second NDP uses even subcarriers.

According to a different embodiment, a wireless access point (AP) is disclosed, including a processor, and a memory coupled to the processor and including instructions that when executed by the processor perform a method of collaborative sounding measurement for a multi-AP (MAP) wireless network. The method includes transmitting a first announcement frame to a wireless station (STA) as a transmission opportunity (TXOP) holder operable to perform collaborative beamforming with a collaborative AP, transmitting a first null data packet (NDP) frame to the STA, and receiving beamforming feedback calculated based on reception of the first NDP frame for performing collaborative beamforming with the collaborative AP.

According to some embodiments, the announcement frame includes an STA info field identifying a basic service set ID (BSSID).

According to some embodiments, the method further includes transmitting, by the collaborative AP, a second announcement frame to the STA, and transmitting, by the collaborative AP, a second NDP frame to the STA, where the STA calculates beamforming feedback based on receiving the second NDP frame from the collaborative AP for performing collaborative beamforming with the collaborative AP.

According to some embodiments, the first NDP frame and the second NDP frame are multiplexed in a frequency domain.

According to some embodiments, the first NDP frame uses odd subcarriers and the second NDP uses even subcarriers.

According to some embodiments, the first NDP frame and the second NDP frame include a collaborative basic service set identification (BSSID) subfield.

According to some embodiments, the method further includes setting the collaborative BSSID subfield of the first NDP frame or the second NDP frame to the BSSID of the collaborative AP.

According to some embodiments, transmission of the first NDP frame and the second NDP overlap in time.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
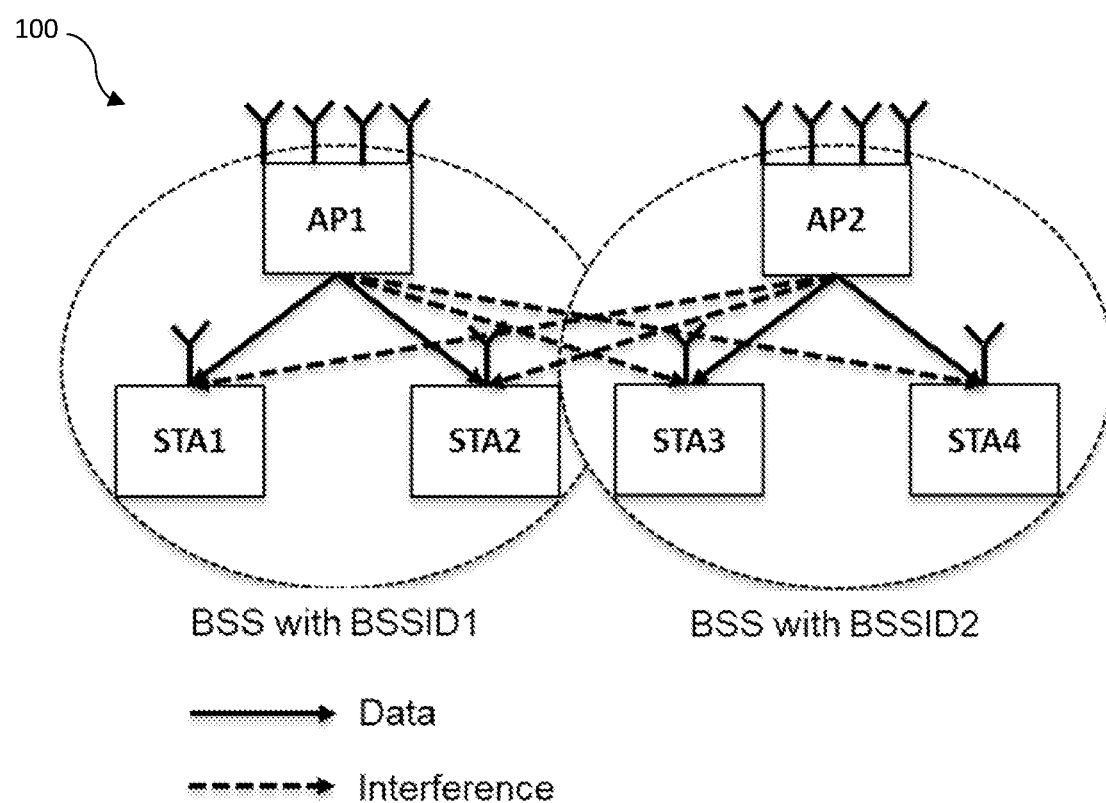
FIG. 1 is a block diagram of an exemplary Multi-AP (MAP) wireless network depicted according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 10 and 11) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Novel Sounding Protocol for Map Wireless Networks

As used herein, the term "EHT" may refer generally to a recent generation of wireless communication (Wi-Fi) known as Extremely High Throughput (EHT) and is defined according to the IEEE 802.11be standards. The term station (STA) refers generally to an electronic device capable of sending and receiving data over Wi-Fi that is not operating as an access point (AP).

Embodiments of the present invention provide an apparatus and method for a MAP wireless network that includes a collaborative channel sounding measurement phase to determine channel state information between devices (e.g., the channel state between an STA and a collaborative AP) for efficient configuration of the MAP wireless network and to improve the performance of the MAP wireless networks. For example, when an AP obtains a transmission opportunity (TXOP), the AP as a TXOP holder can share a portion (e.g., a resource unit (RU)) of the bandwidth allocated by the TXOP with one or more other collaborative APs. The RU can share in the spatial domain, frequency domain, or time domain. In one example, collaborative beamforming is used to nullify the interference between collaborative APs so that the APs can simultaneously transmit data substantially without interference.

With regard to FIG. 1, an exemplary MAP wireless network 100 is depicted according to embodiments of the present invention. When a wireless AP obtains a TXOP frame, the wireless AP (e.g., the TXOP holder) can share a portion of the RU of the bandwidth granted by the TXOP with one or more other collaborative APs within the TXOP. Collaborative beamforming is one approach to enable sharing the RU in the spatial domain. The wireless AP and wireless STAs associated with collaborative APs can simultaneously transmit by applying collaborative beamforming where the interferences between channels nullify each other (e.g., nulling), and the beamforming is performed based on a sounding phase performed by the collaborative APs. The sounding protocol can include a collaborative sounding measurement phase and a collaborative sounding feedback report phase, using Null Data Packets (NDPs), for example, as described herein according to embodiments of the present invention.

FIG. 1 depicts downlink (DL) transmissions between collaborative AP1 and AP2 services wireless stations STA1, STA2, STA3, and STA4. In this example, AP1, STA1, and STA2 belong to a first basic service set (BSSID1), and AP2, STA3, and STA4 belong to a second basic service set (BSSID2). The first basic service set and the second basic service set can be considered one basic service set; however, the first basic service set is associated with a first BSSID and the second basic service set is associated with a second BSSID. The dashed lines represent potential interference between channels. The solid lines represent downlink data transmissions. It is appreciated that the APs and the STAs can also be configured to perform beamforming for cooperative uplink (UL) transmissions.

Multi-AP Collaborative Sounding Measurement Phase for Map Wireless Networks

Figure 2:
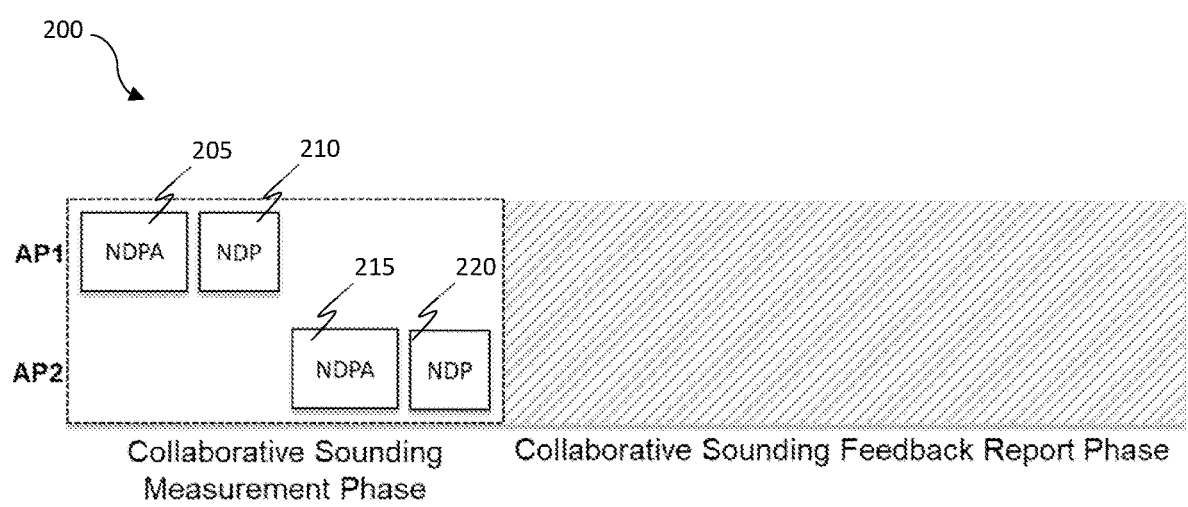
FIG. 2 depicts an exemplary data transmission and timing diagram for performing a collaborative sounding measurement phase of a collaborative sounding protocol in a MAP wireless network according to embodiments of the present invention.

FIG. 2 depicts an exemplary data transmission and timing diagram 200 for performing a collaborative sounding measurement phase of a collaborative sounding protocol in a MAP wireless network according to embodiments of the present invention. As depicted in FIG. 2, the collaborative sounding protocol includes a measurement phase and a feedback report phase performed using null data packet announcement (NDPA) frames 205 and 215 and null data packet (NDP) frames 210 and 220 transmitted between exemplary wireless AP1 and wireless AP2.

The NDPA frames 210 and 220 include a Collaborative BSSID subfield for identifying a basic service set (BSS) serviced by wireless AP1 or wireless AP2. For example, an AP can set the Collaborative BSSID subfield to the BSSID of the corresponding collaborative AP when the wireless AP (e.g., wireless AP1) triggers the collaborative sounding sequence with the corresponding collaborative AP (e.g., wireless AP2). When an STA serviced by wireless AP1 or wireless AP2 receives an NDPA (e.g., NDPA 205 or 215), the STA measures the subsequent NDP (e.g., NDP 210 or 220), and calculates the data channel beamforming feedback (BF) if the NDPA is sent from the wireless AP associated with the STA and the Association ID (AID)11 subfield of the STA Info field of the received NDPA matches the AID of the STA. In this case, the data channel BF represents the channel state between the STA and its associated AP. Otherwise, if the NDPA is not sent from the wireless AP associated with the STA, and the Collaborative BSSID subfield of the STA Info field of the received NDPA matches the BSSID of the wireless AP associated with the STA, the STA measures the subsequent NDP and calculates the interference channel beamforming feedback (BF). The interference channel BF represents the channel state (e.g., interference) between the STA and its collaborative AP (e.g., the wireless AP with that is not associated with the STA, and the NDPA received from the wireless AP indicates the Collaborative BSSID subfield of the STA Info field to the STA's associated AP). Interference channel BF is also known as the inter-BSS BF because it indicates the channel state between the AP of the BSS of which the STA is not a member and the STA.

According to some embodiments, all STAs associated with the collaborative AP calculate the interference channel beamforming feedback (BF).

Figure 3:
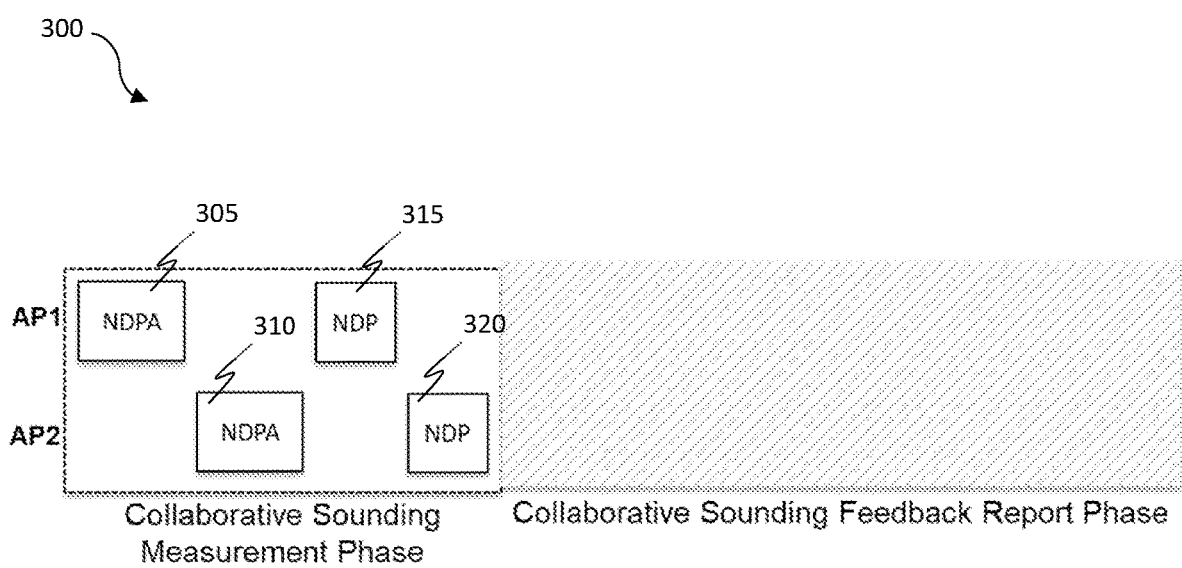
FIG. 3 depicts an exemplary data transmission and timing diagram for performing a collaborative sounding measurement phase of a collaborative sounding protocol in a MAP wireless network according to embodiments of the present invention.

FIG. 3 depicts an exemplary data transmission and timing diagram 300 for performing a collaborative sounding measurement phase of a collaborative sounding protocol in a MAP wireless network according to embodiments of the present invention. Similar to the embodiment depicted in FIG. 2, the collaborative sounding protocol includes a measurement phase and a feedback report phase performed using null data packet announcement (NDPA) frames 305 and 310, and null data packet (NDP) frames 315 and 320 transmitted between exemplary wireless APs AP1 and wireless AP2. However, in the embodiment depicted in FIG. 3, wireless AP2 transmits NDPA frame 310 after wireless AP1 transmits NDPA 305 and before wireless AP1 transmits NDP frame 315.

The NDPA frames 305 and 310 include a Collaborative BSSID subfield, and wireless AP1 and wireless AP2 set the Collaborative BSSID subfield to the BSSID of the corresponding collaborative AP when the AP triggers the collaborative sounding sequence with the collaborative AP. When an STA receives the NDPA (e.g., NDPA 305 or 310), the STA measures the subsequent NDP (e.g., 315 or 320) and calculates the data channel BF if the NDPA is sent from its associated AP and the AID11 subfield of the STA Info field of the received NDPA matches the STA's AID. The data channel BF represents the channel state between the STA and its associated AP.

Otherwise, if the NDPA is not sent from its associated AP but the Collaborative BSSID subfield of the STA Info field of the received NDPA matches the BSSID of its associated AP, the STA (that is identified as the beam-formed STA based on the preceding or subsequent NDPA) measures the subsequent NDP and calculates the interference channel BF. This interference channel BF represents the channel state (e.g., interference) between the STA and its collaborative AP.

Specifically, when a wireless STA STA1 receives the first NDPA sent from its associated AP (e.g., wireless AP1) and the AID11 subfield of the STA Info field of the first NDPA matches wireless STA1's AID, wireless STA1 measures the first NDP and calculates the data channel beamforming feedbacks (BF). When another wireless STA STA3 receives the first NDPA sent from non-associated AP (e.g., wireless AP1) but the Collaborative BSSID subfield of the STA Info field of the first NDPA is matched with the BSSID of its associated wireless AP (e.g., wireless AP2), wireless STA3 waits for the second NDPA to be sent from its associated AP.

When wireless STA1 receives the second NDPA sent from a non-associated AP (e.g., wireless AP2), and the Collaborative BSSID subfield of the STA Info field of the second NDPA matches the BSSID of its associated AP, wireless STA1 measures the second NDP and calculates the interference channel BF. Because wireless STA1 already received the first NDPA and the AID11 subfield of the STA Info field of the first NDPA matches wireless STA1's AID, wireless STA1 is confirmed as the target STA of the collaborative beam-formed transmission. Moreover, when wireless STA3 receives the second NDPA sent from its associated AP (e.g., wireless AP2) and the AID11 subfield of the STA Info field of the second NDPA matches wireless STA3's AID, and wireless STA3 measures the second NDP and calculates the data channel BF. Because wireless STA3 has already received the first NDPA and the Collaborative BSSID subfield matches the BSSID of its associated AP (e.g., wireless AP2), wireless STA3 is confirmed as the target STA of the collaborative beam-formed transmission, and it measures the second NDP and calculates the interference channel BF.

For associating an NDP with an NDPA, the SIG field of the NDP includes the partial BSSID subfield. The partial BSSID field is set to the partial information of the BSSID of the wireless AP included in the associated NDPA. For example, the partial BSSID subfield of the SIG field of the first NDP can be set according to the partial information of the BSSID of the AP (e.g., wireless AP1) included in the first NDPA. The partial BSSID subfield of the SIG field of the second NDP can be according to the partial information of the BSSID of the AP (e.g., wireless AP2) included in the second NDPA.

Figure 4:
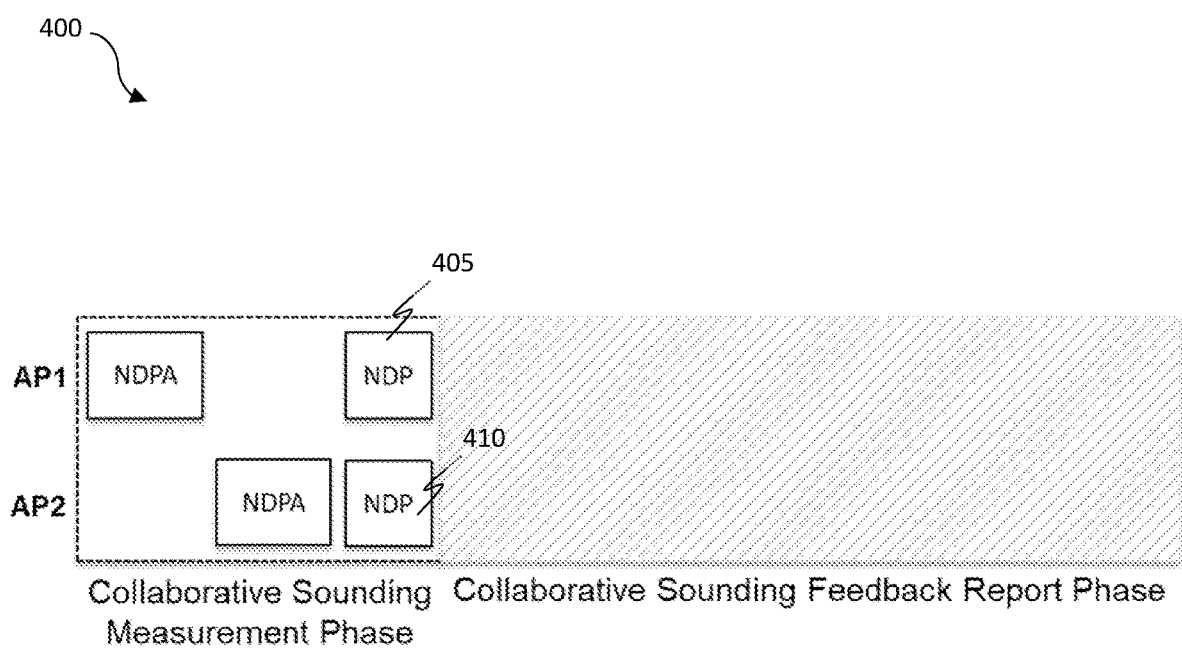
FIG. 4 depicts an exemplary data transmission and timing diagram for performing a simultaneous collaborative sounding measurement phase of a collaborative sounding protocol in a MAP wireless network according to embodiments of the present invention.

FIG. 4 depicts an exemplary data transmission and timing diagram 400 for performing a simultaneous collaborative sounding measurement phase of a collaborative sounding protocol in a MAP wireless network according to embodiments of the present invention. Similar to the embodiment depicted in FIG. 3, the collaborative sounding protocol includes a measurement phase and a feedback report phase performed using null data packet announcement (NDPA) and null data packet (NDP) frames transmitted between wireless AP1 and wireless AP2. However, in the embodiment depicted in FIG. 4, wireless AP1 and wireless AP2 transmit NDP frames 405 and 410 simultaneously. For example, NDPs 405 and 410 can be multiplexed in the frequency domain so that the NDP 405 uses odd subcarriers and NDP 410 uses even subcarriers.

Figure 5:
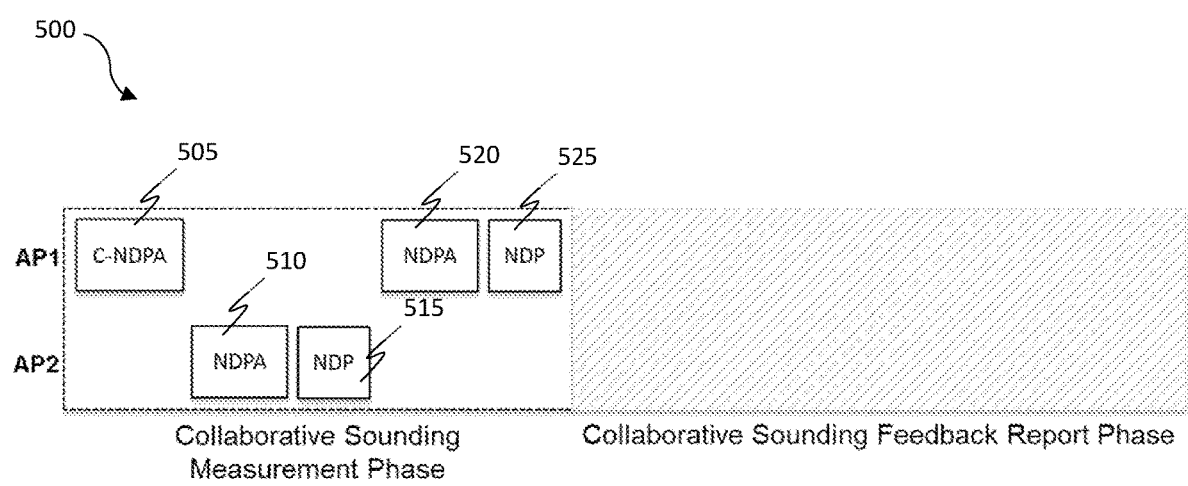
FIG. 5 depicts an exemplary data transmission and timing diagram for performing a collaborative sounding measurement phase of a collaborative sounding protocol using a C-NDPA frame in a MAP wireless network according to embodiments of the present invention.

FIG. 5 depicts an exemplary data transmission and timing diagram 500 for performing a collaborative sounding measurement phase of a collaborative sounding protocol in a MAP wireless network according to embodiments of the present invention. Similar to the embodiments depicted in FIG. 2, the collaborative sounding protocol includes a measurement phase and a feedback report phase performed using NDPA and NDP frames transmitted between wireless AP1 and wireless AP2. However, in this embodiment, the NDPA frames 510 and 520 and NDP frames 515 and 525 are preceded by a cooperative NDPA (C-NDPA) frame 505. As depicted in FIG. 5, wireless AP1 transmits C-NDPA 505 frame to a collaborative wireless AP (e.g., wireless AP2), and the C-NDPA 505 frame identifies the target stations of the collaborative beam-formed transmission which are associated with the wireless AP (e.g., wireless AP1).

The NDPAs 510 and 520 include the Collaborative BSSID subfield and the AP sets the Collaborative BSSID subfield to the BSSID of the collaborative AP when the AP triggers the collaborative sounding sequence with the collaborative AP. When the STA receives an NDPA, the STA measures the subsequent NDP and calculates the data channel beamforming feedback (BF) if the NDPA is sent from its associated AP and the AID11 subfield of the STA Info field of the received NDPA is matched with the STA's AID. The data channel BF represents the channel state between the STA and its associated AP.

Otherwise if the NDPA is not sent from its associated AP but the Collaborative BSSID subfield of the STA Info field of the received NDPA is matched with the BSSID of its associated AP, the STA that is identified as the beam-formed STA based on the preceding or subsequent NDPA measures the subsequent NDP and calculates the interference channel BF. Interference channel BF represents the channel state between the STA and its collaborative AP.

According to some embodiments, an NDPA includes one or more Collaborative STA Info fields, and the Collaborative STA Info fields include the Collaborative BSSID subfield. The Collaborative BSSID subfield is set to the BSSID of the collaborative wireless AP when the wireless AP triggers the collaborative sounding sequence with the collaborative wireless AP. The wireless AP sets the AID11 subfield of the Collaborative STA Info field to the AID of the target station of the collaborative beam-formed transmission which is associated with the collaborative wireless AP.

When the STA receives the NDPA, the STA measures the subsequent NDP and calculates the data channel BF if the NDPA is sent from its associated AP and the AID11 subfield of the STA Info field of the received NDPA is matched with the STA's AID. The data channel BF represents the channel state between the STA and its associated AP. Otherwise, if the NDPA is not sent from its associated AP, the Collaborative BSSID subfield of the Collaborative STA Info field of the received NDPA is matched with the BSSID of its associated AP, and the AID11 subfield of the Collaborative STA Info field is matched with the STA's AID, the STA measures the subsequent NDP and calculates the interference channel BF. In this case, the interference channel BF represents the channel state between the STA and its collaborative AP.

Figure 6:
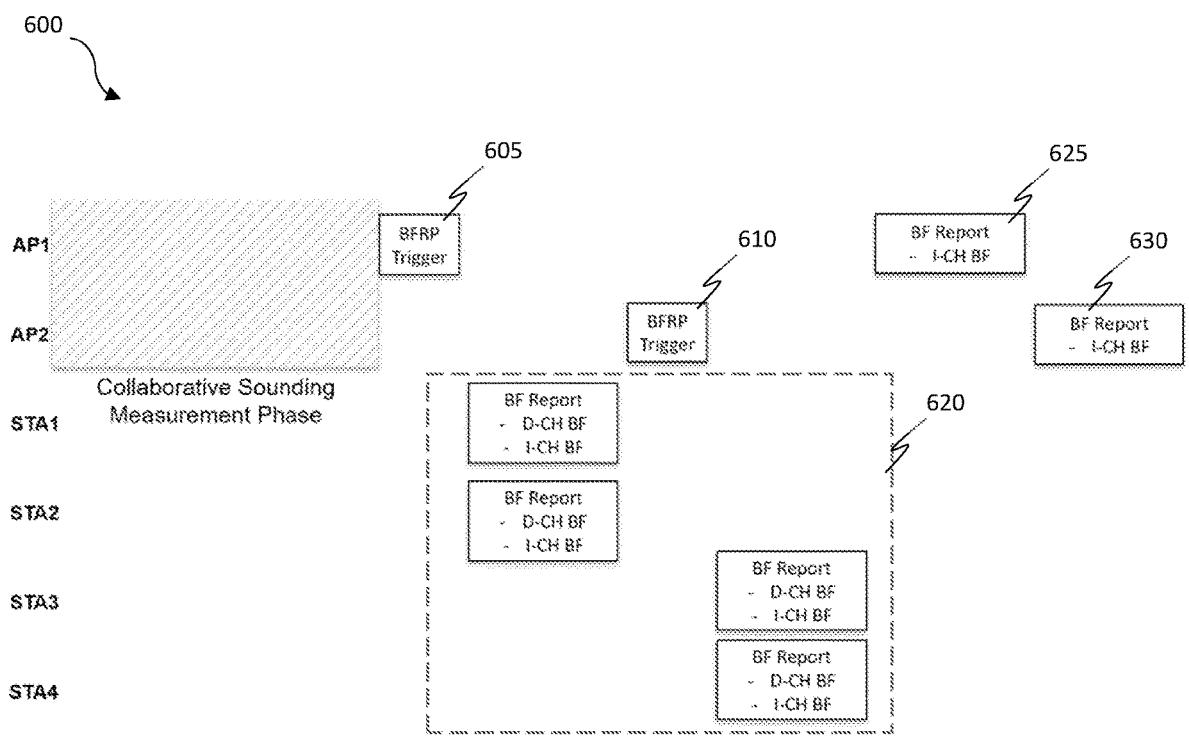
FIG. 6 depicts an exemplary data transmission and timing diagram for performing a collaborative sounding beamforming feedback phase of a collaborative sounding protocol using Indirect Interference Channel Beamforming Feedback in a MAP according to embodiments of the present invention.

Multi-AP Collaborative Sounding Beamforming Feedback Phase for Map Wireless Networks With regard to FIG. 6, an exemplary data transmission and timing diagram 600 for performing a collaborative sounding beamforming feedback phase of a collaborative sounding protocol using Indirect Interference Channel Beamforming Feedback in a MAP wireless network is depicted according to embodiments of the present invention. The collaborative sounding beamforming feedback phase follows a collaborative sounding measurement phase, for example, one of the collaborative sounding measurement phases depicted in FIGS. 2-5 according to embodiments of the present invention. The collaborative sounding beamforming feedback phase includes an STA associated with an AP transmitting a BF Report frame that contains both Data Channel (D-CH) BF and interference channel (I-CH) BF responsive to a Beamforming Feedback Report (BFRP) trigger frame sent by a wireless AP. The BR Report frame can be transmitted using an HE TB PPDU format, for example. When the wireless AP receives BF Report frames, the wireless AP transmits the I-CH BF to a collaborative wireless AP.

Specifically, in the example depicted in FIG. 6, Direct Interference Channel Beamforming Feedback is performed in a collaborative sounding beamforming feedback phase between wireless AP1 and wireless AP2. Wireless AP1 transmits a BFRP Trigger frame 605 that is received by STAs associated with wireless AP1, including wireless STA1 and wireless STA2. Wireless AP2 transmits a BFRP Trigger frame 610 that is received by STAs associated with wireless AP2, including wireless STA3 and wireless STA4. The STAs send BF Report frames 620 including both D-CH BF and I-CH BF to their associated AP responsive to the BFRP trigger frames 605 and 610. For example, wireless AP1 receives a BF Report from wireless STA1 and wireless STA2, and wireless AP2 receives a BF Report from wireless STA3 and wireless STA4. Wireless AP1 then transmits BF Report 625 including the I-CH BF of STA1 and STA2 to the wireless AP2, and wireless AP2 transmits BF Report 630 including the I-CH BF of STA3 and STA4 to wireless AP1.

Figure 7:
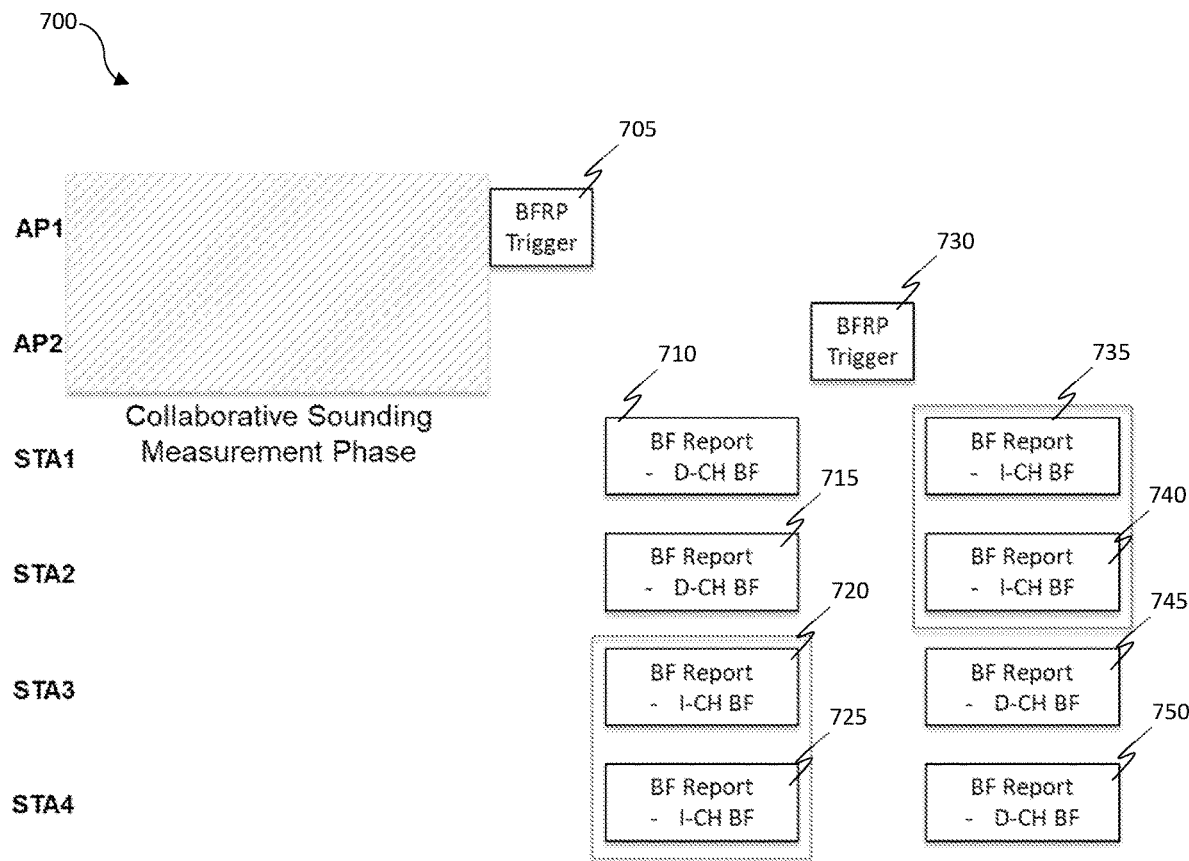
FIG. 7 depicts an exemplary data transmission and timing diagram for performing a collaborative sounding beamforming feedback phase of a collaborative sounding protocol using Direct Interference Channel Beamforming Feedback in a MAP according to embodiments of the present invention.

With regard to FIG. 7, an exemplary data transmission and timing diagram 700 for performing a collaborative sounding beamforming feedback phase of a collaborative sounding protocol in a MAP wireless network using Direct Interference Channel Beamforming Feedback is depicted according to embodiments of the present invention.

The collaborative sounding beamforming feedback phase follows a collaborative sounding measurement phase, for example, one of the collaborative sounding measurement phases depicted in FIGS. 2-5 according to embodiments of the present invention.

As depicted in FIG. 7, a BFRP Trigger frame 705 is transmitted from wireless AP1 and is received by STAs associated with wireless AP1. Wireless STA1 and wireless STA2 associated with wireless AP1 transmit BF Report frames 710 and 715 including D-CH BF. Any of the BF Report frames depicted in FIG. 7 can be transmitted using an HE TB PPDU format, for example.

The BFRP Trigger frame 705 is also received by STAs associated with a collaborative AP (e.g., wireless AP2). After receiving the BFRP Trigger frame from wireless AP1, wireless STA3 and wireless STA4 associated with wireless AP2 transmit BF Report frames 720 and 725 that include I-CH BF. The Trigger Dependent User Info subfield of the BFRP Trigger frame can include the collaborative BSSID subfield. When the collaborative BSSID subfield matches the BSSID of its associated wireless AP, and the AID11 subfield of the User Info field of the received BFRP Trigger frame matches wireless STA's AID, the wireless STA transmits the BF Report frame that contains only the I-CH BF.

A BFRP Trigger frame 730 is also transmitted from wireless AP2 and an analogous process is performed to receive BF Report frames from the STAs. Specifically, the BFRP Trigger frame 730 is received by wireless STA3 and wireless STA4 associated with wireless AP2, and wireless STA3 and wireless STA4 transmit BF Report frames 745 and 750 including D-CH BF. Wireless STA1 and wireless STA2 associated with wireless AP1 transmit BF Report frames 735 and 740 that include I-CH BF. The Trigger Dependent User Info subfield of the BFRP Trigger frame can include the collaborative BSSID subfield. When the collaborative BSSID subfield matches the BSSID of its associated wireless AP, and the AID11 subfield of the User Info field of the received BFRP Trigger frame matches wireless STA's AID, the wireless STA transmits the BF Report frame that contains only the I-CH BF.

Figure 8:
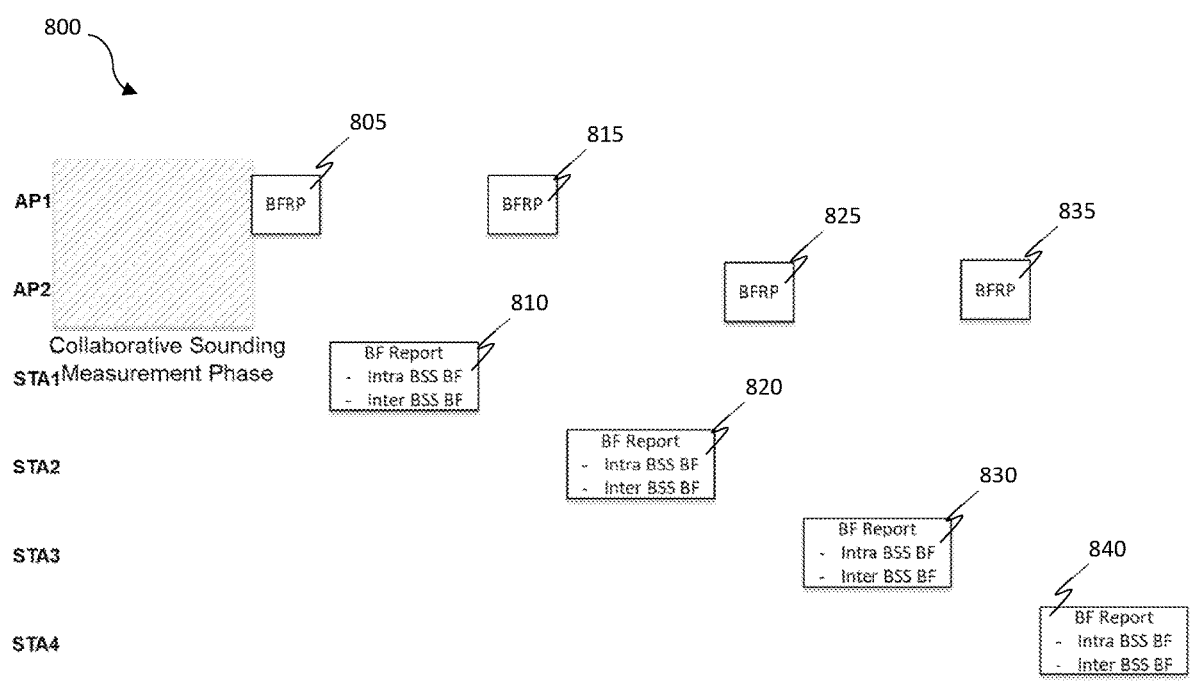
FIG. 8 depicts an exemplary data transmission and timing diagram for performing a collaborative sounding beamforming feedback phase of a collaborative sounding protocol in a MAP wireless network using Broadcast Interference Channel Beamforming Feedback according to embodiments of the present invention.

With regard to FIG. 8, an exemplary data transmission and timing diagram 800 for performing a collaborative sounding beamforming feedback phase of a collaborative sounding protocol in a MAP wireless network using Broadcast Interference Channel Beamforming Feedback is depicted according to embodiments of the present invention. The collaborative sounding beamforming feedback phase follows a collaborative sounding measurement phase, for example, one of the collaborative sounding measurement phases depicted in FIGS. 2-5 according to embodiments of the present invention.

As depicted in FIG. 8, a BFRP Trigger frame 805 is transmitted from wireless AP1 and is received by a wireless STA associated with wireless AP1. The wireless STA transmits a BF Report frame responsive to BFRP Trigger frame 805 including BF from within the BSS associated with the wireless STA (intra BSS BF) and BF from a neighboring (e.g., cooperative) BSS (inter BSS BF). The BF Report frames can be broadcast using a SU PPDU format, for example, and can be received by an associated AP and collaborative APs. The intra BSS BF inter BSS BF includes both D-CH BF and I-CH BF. The I-CH BF includes the BSSID of the collaborative AP used to carry the inference channel feedback.

When the wireless AP receives the BF Report frame, the AP stores the D-CH BF if the AP requested the BF Report frame. Otherwise, if the AP did not request the BF Report frame, the AP stores the I-CH BF when the AP's BSSID matches the BSSID information of the I-CH BF. The above collaborative sounding beamforming feedback phase is performed first by wireless AP1 and repeated by wireless AP2 for its associated wireless STAs.

Specifically, as depicted in FIG. 8, wireless AP1 broadcasts BFRP 805, and STA1 responds with BF Report 810. Wireless AP1 requested the BF Report 810 and therefore stores the D-CH BF included in BF Report 810. Wireless AP1 broadcasts BFRP 815, and STA2 responds with BF Report 820. Wireless AP1 requested the BF Report 820 and therefore stores the D-CH BF included in BF Report 820.

Wireless AP2 also receives BF Report 810 and 820. AP2 did not request BF Report frames 810 and 820 and therefore wireless AP2 stores the I-CH BF included in the report frames 810 and 820 when wireless AP2's BSSID matches the BSSID information of the I-CH BF.

The same process is repeated for BFRPs 825 and 835 broadcast by wireless AP2. Specifically, wireless AP2 broadcasts BFRPs 825, and STA3 responds with BF Report 830. Wireless AP2 requested the BF Report 830 and therefore stores the D-CH BF included in BF Report 830. Wireless AP2 broadcasts BFRP 835, and STA4 responds with BF Report 840. Wireless AP2 requested the BF Report 840 and therefore stores the D-CH BF included in BF Report 840.

Wireless AP1 also receives BF Report 830 and 840. AP2 did not request BF Report frames 830 and 840 and therefore wireless AP2 stores the I-CH BF included in the report frames 830 and 840 when wireless AP1's BSSID matches the BSSID information of the I-CH BF.

Figure 9:
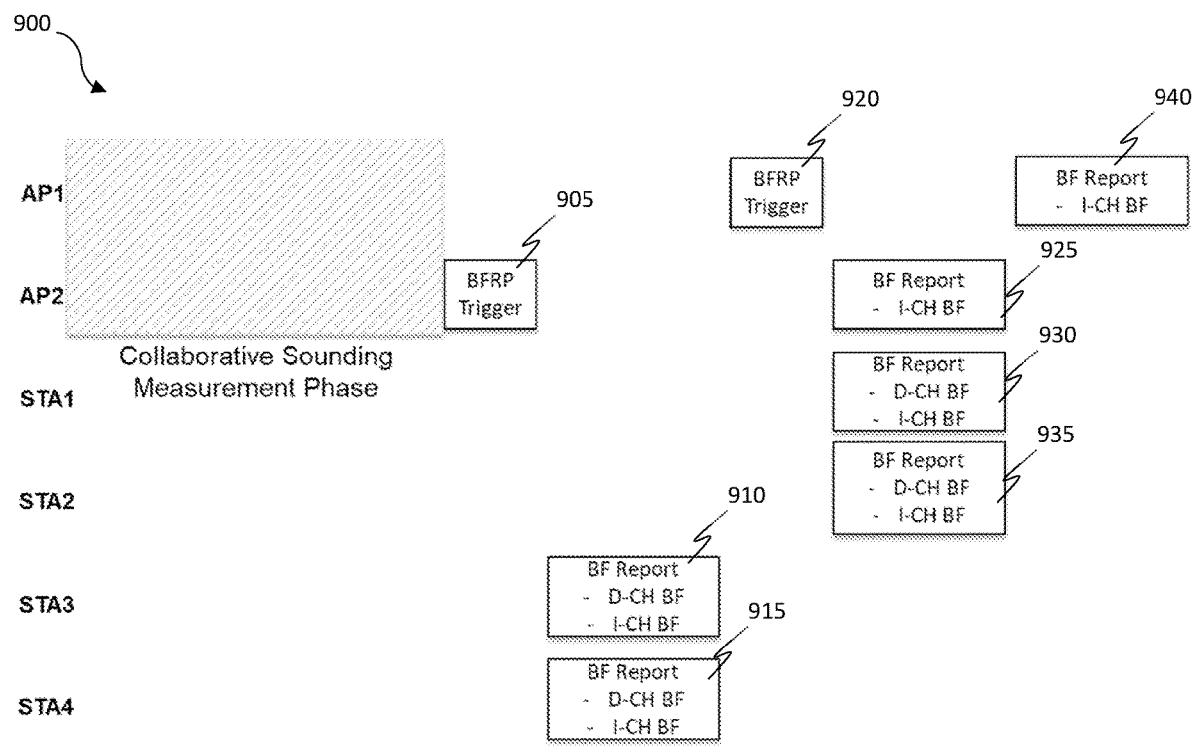
FIG. 9 depicts an exemplary data transmission and timing diagram for performing a collaborative sounding beamforming feedback phase of a collaborative sounding protocol in a MAP wireless network using Hybrid Interference Channel Beamforming Feedback is according to embodiments of the present invention.

With regard to FIG. 9, an exemplary data transmission and timing diagram 900 for performing a collaborative sounding beamforming feedback phase of a collaborative sounding protocol in a MAP wireless network using Hybrid Interference Channel Beamforming Feedback is depicted according to embodiments of the present invention. The collaborative sounding beamforming feedback phase follows a collaborative sounding measurement phase, for example, one of the collaborative sounding measurement phases depicted in FIGS. 2-5 according to embodiments of the present invention.

As depicted in FIG. 9, a BFRP Trigger frame 905 is transmitted from wireless AP1 and is received by STAs associated with wireless AP1. The STAs associated with wireless AP1 transmit BF Report frames including both the D-CH BF and I-CH BF. Wireless STAs associated with a collaborative AP (e.g., wireless AP2) receive the BFRP Trigger frame and transmits the BF Report frame that contains only the I-CH BF. The BF Report frames can be transmitted using an HE TB PPDU format, for example. The wireless AP receives the BF Report frames, and the wireless AP sends the I-CH BF to the collaborative AP. The I-CH BF can also contain other information for scheduling the collaborative beam-formed transmission.

Specifically, as depicted in FIG. 9, wireless AP2 transmits BFRP Trigger frame 905 that is received by its associated wireless STAs (e.g., wireless STA3 and wireless STA4). STA3 and STA4 transmit BF Report frames 910 and 915, respectively, and BF Report frames 910 and 915 include both D-CH BF and I-CH BF because wireless STA3 and wireless STA4 are associated with wireless AP2. AP1 transmits BFRP Trigger frame 920 that is received by its associated wireless STAs (e.g., wireless STA1 and wireless STA2). STA3 and STA4 transmit BF Report frames 930 and 935, respectively, and BF Report frames 930 and 935 include both D-CH BF and I-CH BF because wireless STA1 and wireless STA2 are associated with wireless AP1. AP2 transmits the I-CH BF of STA3 and STA4 in BF Report 925 that is received by AP1. AP1 transmits the I-CH BF of STA1 and STA2 in BF Report 940 that is received by AP2.

Figure 10:
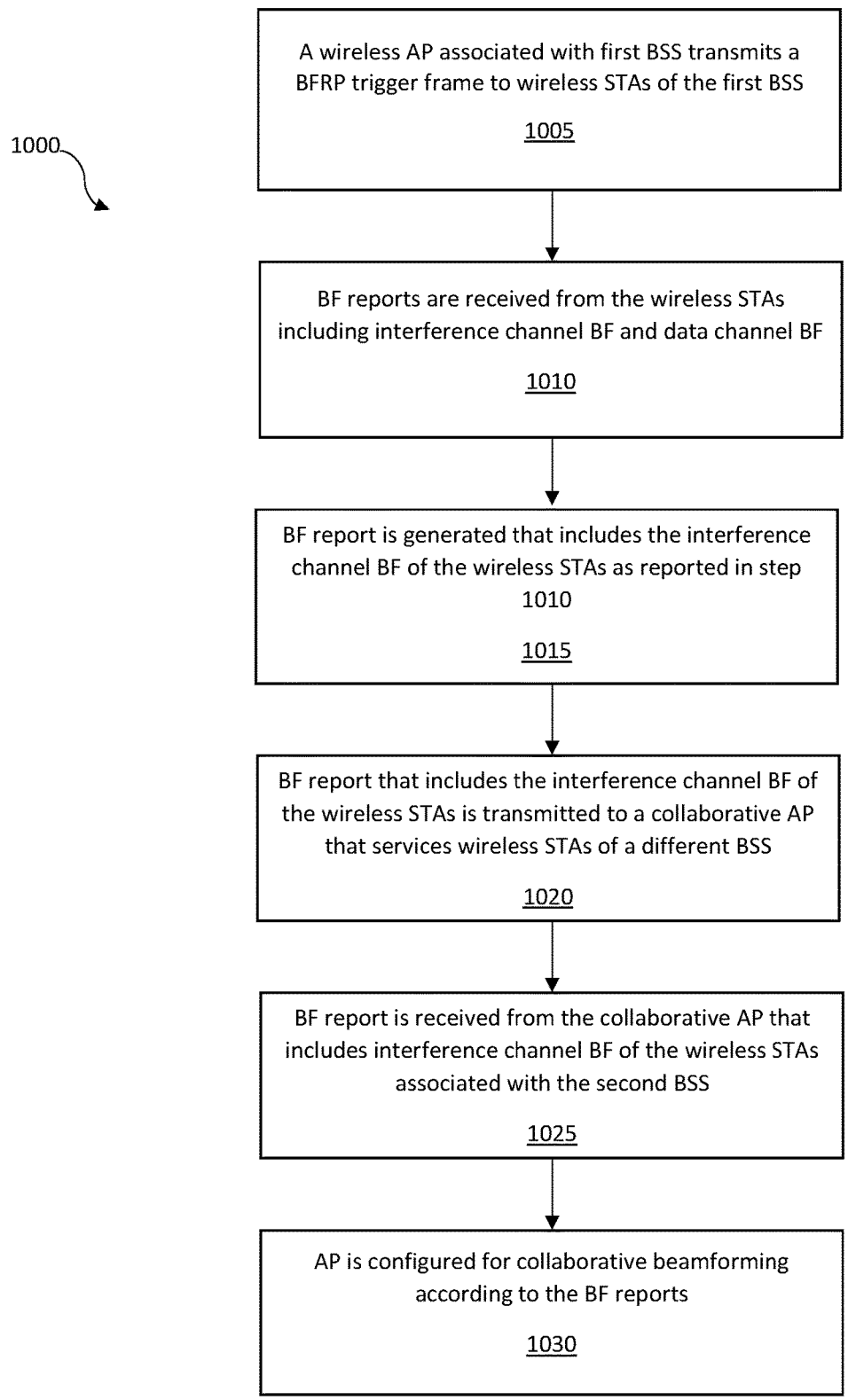
FIG. 10 is a flow chart depicting an exemplary sequence of computer implemented steps of a process for performing collaborative sounding including direct interference channel beamforming feedback according to embodiments of the present invention.

FIG. 10 is a flow chart of an exemplary sequence of computer implemented steps of a process 1000 for performing collaborative sounding beamforming feedback according to embodiments of the present invention. The process 1000 can be performed after a collaborative sounding measurement phase, for example, as described above with reference to FIGS. 2-5.

At step 1005, a wireless AP transmits a BFRP trigger frame from a first wireless AP associated with a first BSS to wireless STAs of the first BSS.

At step 1010, BF reports are received from wireless STAs of the first BSS. The BF reports are transmitted responsive to the BFRP trigger frame and include interference channel BF and data channel BF of the first wireless STA and the second wireless STA.

At step 1015, a BF report is generated that includes the interference channel BF of the wireless STAs as reported in step 1010.

At step 1020, the BF report that includes the interference channel BF of the wireless STAs is transmitted to a collaborative AP that services wireless STAs of a different BSS.

At step 1025, a BF report is received from the collaborative AP that includes interference channel BF of the wireless STAs associated with the second BSS.

At step 1030, the wireless AP is configured for collaborative beamforming to mitigate interference of wireless STAs associated with the second BSS according to the BF reports.

Figure 11:
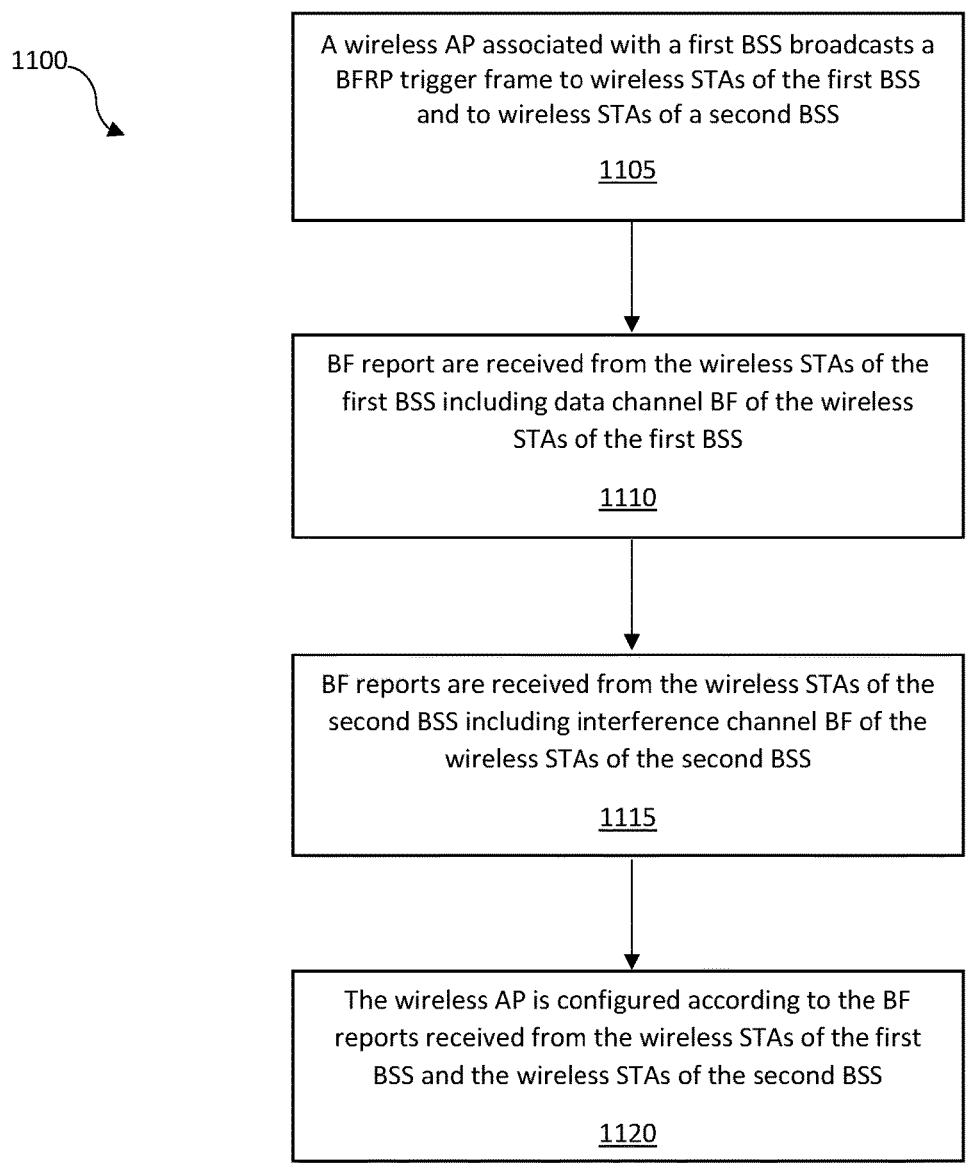
FIG. 11 is a flow chart depicting an exemplary sequence of computer implemented steps of a process for performing collaborative sounding including indirect interference channel beamforming feedback according to embodiments of the present invention

FIG. 11 is a flow chart of an exemplary sequence of computer implemented steps of a process 1100 for performing collaborative sounding beamforming feedback according to embodiments of the present invention. The process 1100 can be performed after a collaborative sounding measurement phase, for example, as described above with reference to FIGS. 2-5.

At step 1105, a wireless AP associated with a first BSS transmitting a BFRP trigger frame to wireless STAs of the first BSS and to wireless STAs of a second BSS.

At step 1110, BF reports are received at the wireless AP from the wireless STAs of the first BSS. The first BF reports are transmitted responsive to the BFRP trigger frame and include data channel BF of the wireless STAs of the first BSS.

At step 1115, a BF reports are received at the wireless AP from the wireless STAs of the second BSS. The BF reports are transmitted responsive to the BFRP trigger frame and include interference channel BF of the wireless STAs of the second BSS. According to some embodiments, step 1115 includes a respective wireless STA matching a collaborative BSSID subfield with the BSSID of an AP associated with the second BSS, and matching an AID11 subfield of the received BFRP Trigger frame with the respective wireless STA's AID.

At step 1120, the wireless AP is configured according to the BF reports received from the wireless STAs of the first BSS and the wireless STAs of the second BSS. It is appreciated that the above steps can be repeated by a collaborative AP so that the collaborative AP can be configured for collaborative beamforming according to BF reports received from the wireless STAs of the first BSS and the wireless STAs of the second BSS.

Exemplary Computer Controlled System

Embodiments of the present invention are drawn to electronic systems for a performing collaborative sounding protocol in a MAP wireless network. The following discussion describes one such exemplary electronic system or computer system that can be used as a platform for implementing embodiments of the present invention. The exemplary computer system 1212 can be a wireless AP or a wireless STA, for example.

Figure 12:
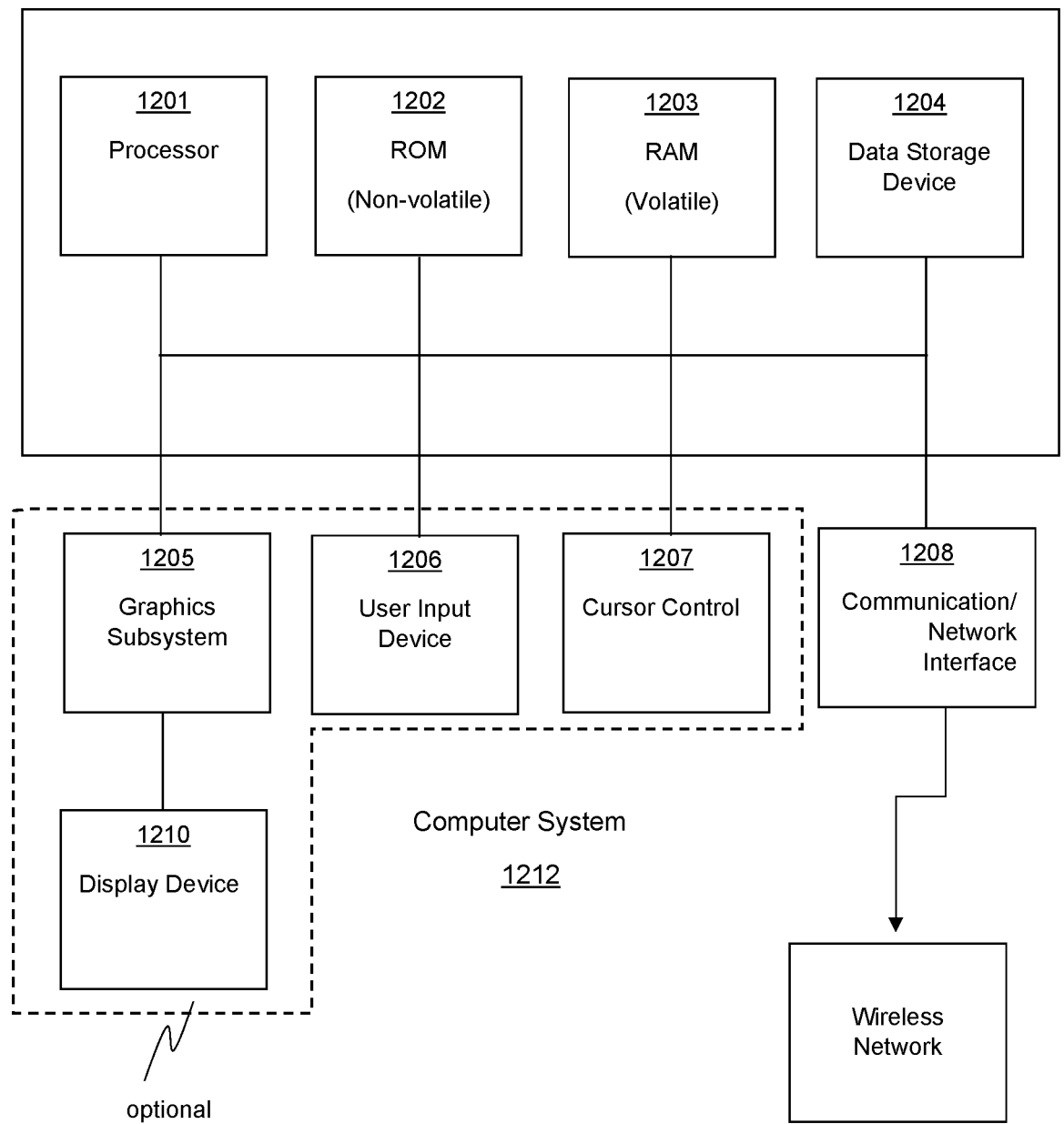
FIG. 12 is a block diagram depicting an exemplary computer system platform upon which embodiments of the present invention may be implemented.

In the example of FIG. 12, the exemplary computer system or wireless device includes a central processing unit (such as a processor or a CPU) 1201 for running software applications and optionally an operating system. Read-only memory 1202 and random access memory 1203 store applications and data for use by the CPU 1201. Data storage device 1204 provides non-volatile storage for applications and data and may include fixed disk drives, removable disk drives, flash memory devices, and CD-ROM, DVD-ROM or other optical storage devices. The optional user inputs 1206 and 1207 comprise devices that communicate inputs from one or more users to the computer system 1212 (e.g., mice, joysticks, cameras, touch screens, and/or microphones).

A communication or network interface 408 includes a plurality of transceivers and allows the computer system 1212 to communicate with other computer systems, networks, or devices via an electronic communications network, including wired and/or wireless communication and including an Intranet or the Internet (e.g., 802.11 wireless standard). According to embodiments of the present invention, the communication or network interface 1208 can operate multiple transceivers simultaneously. The communication or network interface 1208 can further include a cooperative management unit for coordinating the data sent and/or received by the transceivers. Moreover, the network interface 1208 can be configured to perform a collaborative sounding protocol in a MAP wireless network to determine channel state information with neighboring BSSs and APS of the MAP wireless network. The sounding protocol can include a collaborative sounding measurement phase and a collaborative sounding feedback report phase, using NDPs, for example, as described herein according to embodiments of the present invention. The network interface 1208 can be configured to perform collaborative beamforming according to the results of the sounding protocol.

The optional display device 1210 may be any device capable of displaying visual information in response to a signal from the computer system 1212 and may include a flat panel touch sensitive display, for example, and may be remotely disposed. The components of the computer system 1212, including the CPU 1201, memory 1202/1203, data storage 1204, user input devices 1206, and graphics subsystem 1205 may be coupled via one or more data buses.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of collaborative sounding measurement in a multi-AP (MAP) wireless network, the method comprising:
   receiving, by a wireless station (STA), a first announcement frame from an access point (AP), wherein the AP is a transmission opportunity (TXOP) holder operable to perform collaborative beamforming with a collaborative AP;
   receiving, by the STA, a first null data packet (NDP) frame from the AP; and
   calculating beamforming feedback based on the receiving the first NDP frame from the AP for performing collaborative beamforming between the AP and the collaborative AP.

2. The method of claim 1, wherein the calculating beamforming feedback comprises the STA calculating data channel beamforming feedback between the STA and the AP.

3. The method of claim 1, further comprising:
   receiving, by the STA, a second announcement frame from the collaborative AP;
   receiving, by the STA, a second NDP frame from the collaborative AP; and
   calculating beamforming feedback based on the receiving the second NDP frame from the collaborative AP for performing collaborative beamforming between the AP and the collaborative AP.

4. The method of claim 3, wherein the calculating beamforming feedback based on the receiving the second NDP frame from the collaborative AP comprises calculating interference channel beamforming feedback between the STA and the collaborative AP.

5. The method of claim 3, further comprising accessing, by the STA, an STA info field of the second announcement frame to determine if the second announcement frame corresponds to a basic service set ID (BSSID) of the STA.

6. The method of claim 3, wherein the first NDP frame and the second NDP frame are multiplexed in a frequency domain.

7. The method of claim 6, wherein the first NDP frame uses odd subcarriers and the second NDP uses even subcarriers.

8. A method of collaborative sounding measurement in a multi-AP (MAP) wireless network, the method comprising:
   transmitting, by an access point (AP), a first announcement frame to a wireless station (STA), wherein the AP is a transmission opportunity (TXOP) holder operable to perform collaborative beamforming with a collaborative AP;
   transmitting, by the AP, a first null data packet (NDP) frame to the STA; and
   receiving beamforming feedback calculated based on reception of the first NDP frame for performing collaborative beamforming between the AP and the collaborative AP.

9. The method of claim 8, wherein the announcement frame comprises an STA info field identifying a basic service set ID (BSSID).

10. The method of claim 8, further comprising:
    transmitting, by the collaborative AP, a second announcement frame to the STA; and
    transmitting, by the collaborative AP, a second NDP frame to the STA, wherein the STA calculates beamforming feedback based on receiving the second NDP frame from the collaborative AP for performing collaborative beamforming between the AP and the collaborative AP.

11. The method of claim 10, wherein the first NDP frame and the second NDP frame are multiplexed in a frequency domain.

12. The method of claim 10, wherein the first NDP frame uses odd subcarriers and the second NDP uses even subcarriers.

13. A wireless access point (AP) comprising:
    a processor; and
    a memory coupled to the processor and comprising instructions that when executed by the processor perform a method of collaborative sounding measurement for a multi-AP (MAP) wireless network, the method comprising:
    transmitting a first announcement frame to a wireless station (STA) as a transmission opportunity (TXOP) holder operable to perform collaborative beamforming with a collaborative AP;
    transmitting a first null data packet (NDP) frame to the STA; and
    receiving beamforming feedback calculated based on reception of the first NDP frame for performing collaborative beamforming with the collaborative AP.

14. The wireless AP of claim 13, wherein the announcement frame comprises an STA info field identifying a basic service set ID (BSSID).

15. The wireless AP of claim 13, wherein the method further comprises:
    transmitting, by the collaborative AP, a second announcement frame to the STA; and
    transmitting, by the collaborative AP, a second NDP frame to the STA, wherein the STA calculates beamforming feedback based on receiving the second NDP frame from the collaborative AP for performing collaborative beamforming with the collaborative AP.

16. The wireless AP of claim 15, wherein the first NDP frame and the second NDP frame are multiplexed in a frequency domain.

17. The wireless AP of claim 15, wherein the first NDP frame uses odd subcarriers and the second NDP uses even subcarriers.

18. The wireless AP of claim 15, wherein the first NDP frame and the second NDP frame comprise a collaborative basic service set identification (BSSID) subfield.

19. The wireless AP of claim 18, wherein the method further comprises setting the collaborative BSSID subfield of the first NDP frame or the second NDP frame to the BSSID of the collaborative AP.

20. The wireless AP of claim 15, wherein transmission of the first NDP frame and the second NDP overlap in time.

\* \* \* \* \*